United States Patent [19]

Kelley

[11] 4,123,489

[45] Oct. 31, 1978

[54] METHOD FOR CONVERTING WASTE PAPER PRODUCTS INTO USEFUL FORMS

[75] Inventor: Joseph A. Kelley, Chicago, Ill.

[73] Assignee: Flett Development Company, Chicago, Ill.

[21] Appl. No.: 797,623

[22] Filed: May 17, 1977

[51] Int. Cl.² ............................................. B02C 18/44
[52] U.S. Cl. ...................................... 264/141; 162/4; 241/24; 241/27; 241/221; 264/DIG. 69
[58] Field of Search ............................... 264/140-141, 264/37, DIG. 69, 115; 241/24, 27, 28, 221, 222, DIG. 38; 162/4-8, 50, 55

[56] References Cited

U.S. PATENT DOCUMENTS

| | | | |
|---|---|---|---|
| 2,715,067 | 8/1955 | Kamlet | 99/2 |
| 3,524,594 | 8/1970 | Anderson et al. | 241/19 |
| 3,573,924 | 4/1971 | Zarow | 426/635 |
| 3,671,615 | 6/1972 | Price | 264/115 |
| 3,726,208 | 4/1973 | Brengman et al. | 426/518 |
| 3,736,221 | 5/1973 | Evers et al. | 162/4 |
| 3,741,863 | 6/1973 | Brooks | 241/DIG. 38 |
| 3,790,091 | 2/1974 | Law et al. | 241/24 |
| 3,839,522 | 10/1974 | Batley, Jr. | 264/115 |
| 3,848,813 | 11/1974 | Stanczyk et al. | 241/19 |
| 3,925,150 | 12/1975 | Marsh | 241/24 |

Primary Examiner—Jeffery R. Thurlow
Attorney, Agent, or Firm—Mason, Kolehmainen, Rathburn & Wyss

[57] ABSTRACT

A method is provided for converting waste paper materials into more useful forms for uses such as plant mulches, lightweight concrete aggregates, fertilizers, animal feeds, chemical food stock and other materials, fuels and uses such as recycling paper processes. Waste paper materials including corrugated box board, paper board, paper of all types, etc. is available as a raw material in a wide variety of forms such as sheets, bales, bundles, boxes, shavings, clippings from box making operations, magazines, newspapers, etc. and these products are much more useful for the purposes and uses mentioned after treatment and conversion into a more useful form. This conversion includes the steps of bale breaking, sorting, trimming and/or cutting these raw materials into pieces of relatively limited size for feeding across a cutter bar into a rotating knife cylinder wherein the raw materials are cut into small pieces. The small pieces are passed through a recutter screen having sizing openings and cooperating with the rotating knife cylinder for further reduction in size. Metal and other undesirable impurities are removed before cutting and again after cutting and the finished cuttings are then formed into extruded pellets under heat and pressure or the cuttings may be bagged or compressed into bales. The cuttings may also be mixed with a large variety of ingredients such as chemicals, feed supplements, additives, water, lubricants, other organic and inorganic material and then may be bagged, baled or pelleted.

14 Claims, 2 Drawing Figures

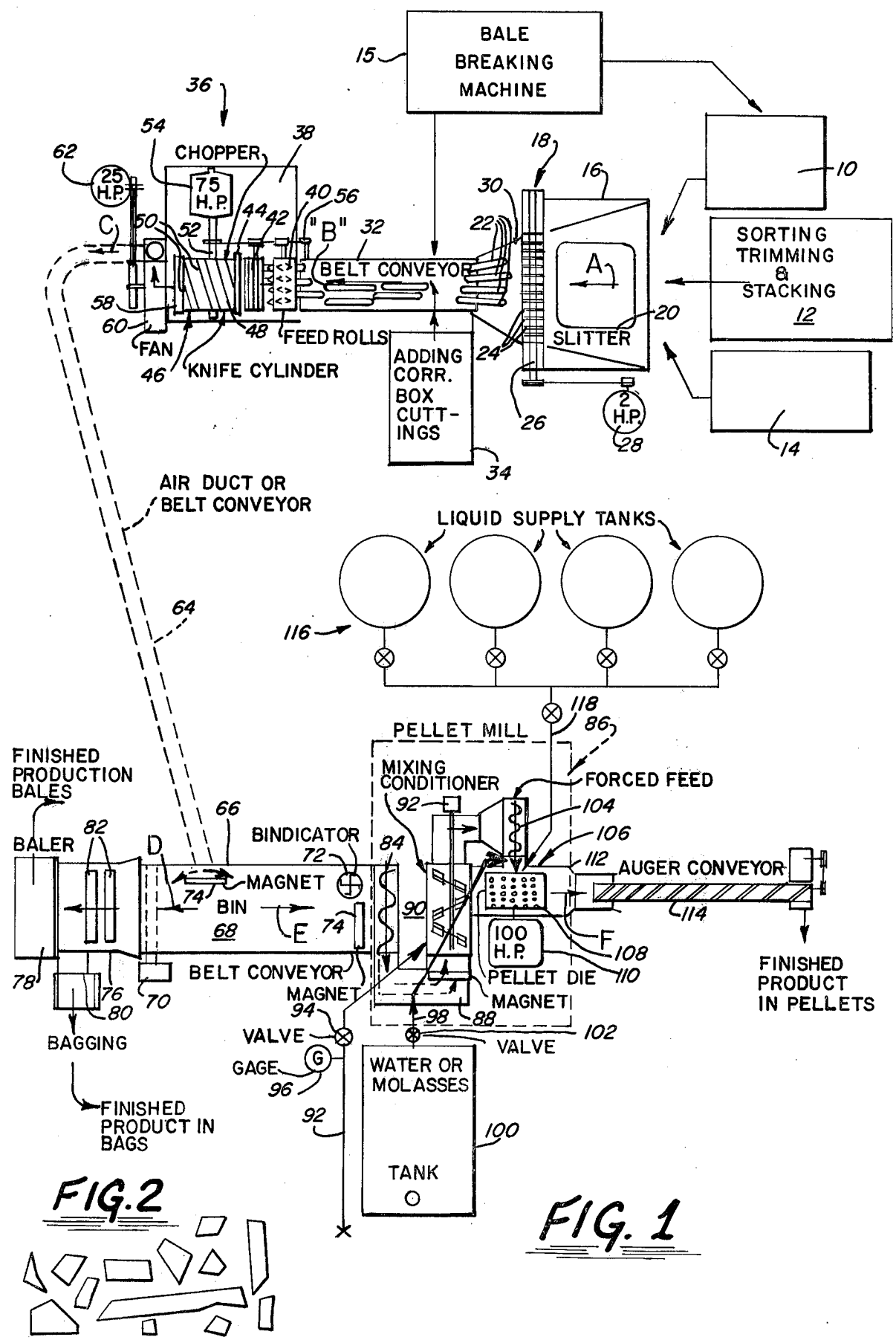

METHOD FOR CONVERTING WASTE PAPER PRODUCTS INTO USEFUL FORMS

BACKGROUND OF THE INVENTION

1. Field of the Invention

The present invention relates to a new and improved method, system and apparatus for treating and converting waste paper materials or by-products into useful forms. More particularly, the invention relates to the treatment of waste paper materials to convert these materials into a more useful form whereby the material may be used as a plant mulch, an aggregate for lightweight concretes, a fertilizer, an animal feed and/or constituent thereof, chemical feed stock, and other uses such as in recycling processes. Cellulosic fibers which are readily available in waste paper materials are valuable for use as dry forage material in feeds for cattle and other ruminant animals because of their fiber content and their energy value. The present invention provides a means wherein waste paper materials are converted from the raw material available into a more useful form such as extruded pellets.

2. Description of the Prior Art

U.S. Pat. No. 3,044,877 discloses a pelleted animal feed wherein cellulosic waste material is used in conjunction with green forage material. U.S. Pat. No. 3,878,304 is directed to a method of producing pelleted, slow release NPN feed for ruminant animals from polysaccharide materials and waste paper is indicated as an ingredient in the feed. U.S. Pat. No. 4,006,253 is directed to a process for making an NPN ruminant feed supplement wherein cellulosic commodities are mixed with a urea acid. U.S. Pat. No. 2,472,663 discloses a cattle feed including digestible paper pulp as an ingredient, and U.S. Pat. No. 3,212,932 discloses a process of selective hydrolysis of lignolcellulose materials as saw mill wastes. U.S. Pat. No. 3,726,208 is directed toward a comminuting method and apparatus wherein a plurality of circular cutting discs are provided to move in close proximity with a cylindrical cage of rings forming a sizing screen for chopping or comminuting material into small particles. U.S. Pat. No. 2,831,769 discloses a method for the preservation and improvement of the assimilibility of feed stuffs wherein waste newsprint is utilized for cellulosic fiber and U.S. Pat. No. 2,715,067 discloses a fodder for ruminant animals wherein waste newsprint is utilized as a digestible substitute for other types of cellulose containing green roughage materials such as alfalfa, grass and the like. U.S. Pat. No. 3,573,924 discloses a method of making pelletized animal feed which includes molasses mixed with other materials and live steam to form a pelleted finished product.

Machines such as Forage Harvesters for example, the FOX, Model 3000 chopper manufactured by the Koehring Farm Division and described in their catalogue No. 716-10107 (incorporated herein by reference) have been utilized to chop and grind up forage materials such as grasses, straws, legumes and the like, for use in animal feeds. Various types of tub grinders such as those manufactured by the Farmhand Co., Hopkins, Minn., have also been used for chopping and grinding hay, straws, grasses and the like. Various types of machines such as hammermills, grinders, paper shredders, balers, bag filler and pellet mill extrusion machines are available. The California Pellet Mill Co. of San Francisco, Calif., manufactures and sells a wide variety of pellet mills for use in making pelleted animal feeds, for example, the CPM Series 7000 mills as described in their Bulletin thereon (incorporated herein by reference) is well adapted for this process.

For converting and preparing waste materials, the use of hammermill type machines results in the formation of a very dry, dusty, fuzzy, ultra lightweight (½ - 2# per cubic foot) lint-like material resembling cotton. This material may be baled, it may be mixed with other feed ingredients and other materials such as cement, fertilizer, etc., but with the great bulk and fluffy nature, the steps including proportioning, blending, etc. are very difficult and costly. Also, much dust is created and the material is greatly subject to fire from friction and in fact, explosions are not uncommon in such systems of paper preparation.

Before sheets or other shapes of waste paper can be used in any dry or semi-dry form they must be prepared and put in condition for further steps, such as mixing, blending, conveying and proportioning with other materials. This is required, for example, because animals will not ordinarily eat corrugated boxes as such unless they are starving. The preparation steps are important from a use standpoint, from a cost standpoint, and from a subsequent manufacturing and shipping standpoint.

Waste paper materials treated in hammermill type machines are very difficult to form into pellets and the pellet form is highly desirable because of the reduction in dust and because of the ease in handling, weighing and blending of a pelletized product. Also, pellets are densified making transportion costs much more economical. As yet, there has been little or no success in pelletizing hammermill treated waste paper materials.

It has been found in the prior attempts to utilize waste paper materials such as corrugated box board, paper carton material and other waste paper products for integration into animal feed and other uses as a source of cellulosic fiber that often times the success or failure in terms of assimibility or digestibility of the feed by the animals is dependent upon the method and type of physical preparation of the waste paper material. In addition, it has been found that in the prior art methods of treatment of such materials it is extremely difficult if not impossible, to economically palletize or form the material into pellets which are readily intermixed and integrated with other nutritional elements in animal feed.

For example, attempts have been made to chop up sheet waste paper materials in conventional type hammermills with little success. Similarly, tub grinders have met with unsatisfactory results when used for grinding up or comminuting waste paper sheets into fodder-like material suitable for integration into animal feed. It has been found that the method of preparation of the materials is an extremely important factor in making the waste paper materials readily assimible and digestible by the animals. Moreover, it has been found that the method of preparation of the waste paper materials also is an important factor in the success of forming the material into pellets in existing and available pellet mills and extrusion machinery.

It is a principal object of the present invention to provide a new and improved method of treating waste paper products to convert these products into a more useful form.

More particularly, it is an object of the invention to provide a method of producing extruded pellets from waste paper products such as corrugated box board, paper board, paper and the like.

It is another object of the invention to provide a new and improved method, system and apparatus for treating waste paper materials to convert these products into forms which are useful as plant mulches, fertilizers, fuels, animal feeds, chemical feed stock, lightweight concrete aggregates, and other use such as recycling processes.

Still another object of the invention is to provide a new and improved method of treating waste paper materials to convert the same into more useful forms which method results in reduced or no dust problems and which results in a finished material that is more dense, easy to handle and blend, easy to proportion and mix and generally less troublesome than hammermill treated waste paper products.

It is another object of the invention to provide a new and improved method of converting waste paper materials into useful forms which is capable of handling corrugated box board in a variety of forms, paper board in a variety of forms, and paper in a wide variety of forms including magazines and newspapers.

It is an object of the present invention to provide a new and improved method and apparatus for making animal feed material from waste paper materials and the like.

It is an object of the present invention to provide a new and improved method and apparatus of the character described wherein the finished product is highly adapted for use in animal feeds either in baled, bagged or pelletized form.

Yet another object of the present invention is to provide a new and improved method and apparatus for making animal feed material in pellet form from waste paper products and the like.

Yet another object of the present invention is to provide a new and improved method and apparatus for making animal feed material in accordance with the previous objects wherein a pelletized material is produced and is readily intermixed with other feed materials containing protein and/or carbohydrate and other desirable materials to provide either a supplement or a complete or balanced, highly nutritional animal feed for ruminant animals.

SUMMARY OF THE INVENTION

The foregoing and other objects and advantages of the present invention are accomplished in accordance with an illustrative embodiment thereof wherein waste paper raw materials which may include sheets and bales of corrugated box board, paper board, papers of all kinds and box cuttings, etc., are treated to provide more useful forms for the variety of usages previously mentioned. Bales are broken by hand or by use of a machine such as a manure spreader adapted for the purpose, and the steps of sorting, slitting, flattening and trimming the material into pieces of relatively limited size are then accomplished. Foreign objects and undesirable matter is removed and the pieces are fed across the cutter bar of a rotary cutter which includes a rotating knife cylinder having a plurality of blades for cutting the pieces fed into the machine into smaller pieces or particles.

The cutter includes a recutter screen having a surface cooperating with the periphery of the rotating knife cylinder providing sizing openings for further reducing the size of the pieces of waste paper materials. These pieces that pass through the recutter screen are cut to a maximum size of ⅛ inch × 2 inches, for example. Thus prepared, the material is then suitable for baling, mixing, bagging or molding into extruded pellets and during the process any remaining metal and/or other undesirable impurities are removed.

The prepared cut material is now in a form suitable to be easily handled, conveyed, proportionally mixed and pelletized, etc. The particles or pieces are of generally small, fingernail size and have a considerably higher bulk density than similar raw materials treated in a hammermill and/or similar machines. For example, the following is a table showing the loose bulk density in pounds per cubic foot of various types of raw materials after cutting in accordance with the invention in comparison with a hammermill:

| Material | Hammermill | Present Invention |
| --- | --- | --- |
| Magazines | ½ - 2 | 4 - 6 |
| Corrugated Boxes | 1 - 2 | 6 - 7 |
| Newspaper | ½ - 2 | 4 - 6 |

The cut material or finished product in accordance with the invention flows much easier in chutes, at lower slope angles and will move well on a vibrating conveyor as well as in a small diameter screw conveyor. Furthermore, the precut prepared material can be easily fed into the die cavity of a pelleting machine (16 inches diameter - ¼ inch to ⅜ inch pellets, for example) to form high quality, relatively dust-free, pellets of paper material. These pellets are adapted for use as a fuel, as an animal feed, and can be easily blended and intermixed with other materials for a wide variety of uses, some of which have been previously referred to herein. The material may be compressed into bales or bagged and in these forms may be used for direct feeding or intermixing with other feed materials. Baled material may have a density range of 15 to 25 pounds per cubic foot.

When the waste paper material is received in bale form, it must be broken and pulled loose from the bale. This step can be accomplished by a bale breaking machine especially designed or an ordinary manure spreader has been found useful to this purpose upon being modified to suit the situation.

Preferably, the apparatus of the invention includes a sorting and trimming area or station wherein obviously contaminated material is removed along with the removal of any metal objects such as staples, tags and the like.

Where needed, the paper material is flattened out to some extent and is sorted and trimmed for size before feeding into a cutting or slitting apparatus which cuts or slices the sheets into elongated strips. Magazines and newspapers do not need to be slit, although they can be slit into strips if desired. The elongated strips are fed by a conveyor into a rotary cutter of the type having a cutter bar and rotary knife cylinder as previously described. The flow of material to the cutter may also be supplemented with additional pieces of corrugated box material such as cuttings available from box companies. This material is provided as needed to maintain a relatively constant load on the cutter. The cutter also includes a sizing or recutter screen having cutter bars or sized openings and cooperating with the knives for further cutting and reducing the size of the material.

Raw materials for the cutter supplied in baled form, such as bales of corrugated boxes and box board is often available from grocery stores, liquor stores, manufacturing plants as well as other sources. The bales are broken open as set forth above and may be fed directly to the cutter or may be sorted and trimmed to size as necessary. In addition, loose boxes may be fed into the cutter if the boxes are of appropriate size or the boxes may be broken down and sorted and trimmed as necessary before feeding to the cutter.

A fan, a conveyor or other suitable transport means is provided for removing the material from the cutter and directing it into a bin or storage tank from which the material may be directed into a bagger or a baling machine on the one hand, or into a feeding device for supplying and intermixing the material with or without other materials and a lubricant such as water or molasses for extrusion through the annular die of a conventional pellet mill.

BRIEF DESCRIPTION OF THE DRAWING

For a better understanding of the present invention, reference should be had to the following detailed description taken in conjunction with the drawings, in which:

FIG. 1 is a schematic and graphical representation of the apparatus in accordance with the features of the present invention used for material from treating waste paper materials such as corrugated box board, paper board and paper and the like, to convert the material into useful forms; and FIG. 2 is a graphical representation illustrating a number of pieces of waste paper material after treatment in accordance with the features of the present invention and indicating typical shapes and sizes of the cut pieces of material.

DESCRIPTION OF THE PREFERRED EMBODIMENT

Referring now more particularly to the drawings, therein is illustrated a system for making animal feed and other products, such as previously mentioned from waste paper products such as corrugated box board, paper board, paper and the like. The rectangles 10, 12 and 14 represent stacks or piles where waste paper material in bales, boxes or sheets are broken open and are sorted and trimmed as necessary to a suitable working size. A bale breaking machine 15 may also be provided when required. Those materials which are obviously contaminated for any reason with undesirable contaminants are eliminated in the sorting procedure and metal objects such as staples, tags, fasteners and the like are removed. The sorted and trimmed materials may then be fed onto a feed table 16 of a slitting device 18 which is adapted to slit or slice the relatively large, oversize piece of material (represented by numeral 20) into a plurality of elongated strips as indicated by the reference numeral 22. The cutting device 18 includes a plurality of circular knives or blades 24 which are mounted on a common, driven mandrel or axle 26 which is powered at an appropriate speed by a motor 28. The sheets 20 are manually fed in the direction of arrows "A" into contact with lower portions of the rotating, spaced apart, cutter knives 24 which slice the sheets into the elongated strips 22. There may also be provided a series of mandrels and the cut pieces from the first are fed to the second so as to further cut the material into thin strips, for example as small as ¼ inch. The strips are ejected into a discharge chute 30 which directs the strips onto a belt conveyor 32. Preferably, the sheets 20 are trimmed to a maximum dimension of 4 feet or less so that all portions of a sheet will pass into contact with the knives for cutting into elongated strips of any desired width as for example, 4 inches to 5 inches wide. The knives are appropriately spaced on the mandrel to provide the desired strip width. In addition, corrugated box board cuttings obtained from box manufacturing plants may be added to the flow of strips 22 on the conveyor 32 from an adjacent bin or other storage location represented by the numeral 34. These additional corrugated box cuttings may be used as needed to stabilize and maintain a more constant flow rate of material along the conveyor 32.

In addition, raw materials in bales such as bales of boxes, box board and paper board, and bales of paper trimmings, magazines and newspapers may be supplied to the feed conveyor. The bales are first opened by hand or in a bale breaking machine such as a manure spreader or other bale breaker, and the materials are sorted and trimmed as necessary. Also, boxes may be utilized and these may be mechanically flailed and flattened for better and easier feeding.

The elongated strips of material 22 pass along the belt conveyor 32 in the direction of the arrows "B" to a cutting station generally indicated by the reference numeral 36. At the cutting station, the strips are moved onto a guiding surface 38 beneath a pair of floating feed rolls 40 and 42 which direct the strips transversely across an elongated cutter bar or knife 44 of a rotary cutter generally indicated by the reference numeral 46. It has been found that a cutter of the type manufactured by the Koehring Farm Division, such as Fox, Model 3000, works effectively to chop and cut the elongated strips 22 into smaller discrete particles or pieces in accordance with the present invention. The cutter 46 is provided with a generally cylindrical knife cylinder 48 which includes a plurality of blades 50 mounted on spiders carried by a main drive shaft 52. The rotating blades of the knife cylinder 48 cooperate with cutter bar 44 to cut and chop the incoming strips 22 into small discrete pieces as the strips move transversely across the cutter bar. The drive shaft of the cutter is connected to a motor or other prime mover 54 of properly selected horsepower and speed, and this motor is also used for driving the feed rolls 40 and 42 by means of a common drive train indicated by the reference numeral 56.

On the outlet side of the knife cylinder 48 there is provided an arcuate, cooperating cutter or recutter screen indicated by the numeral 58. The recutter screen includes a plurality of cutter bars forming rectangular, square or round shaped sizing openings and the onsize pieces of material are drawn through these openings by a suction fan which moves a flow of air along with chopped pieces of material through the cutter apparatus. As an alternative, the onsize pieces may drop from the recutter screen onto a conveyor.

Reference should be had to the Fox Model 3000 Instruction Manual, catalogue number 716-10107 (incorporated herein by reference) for a more complete description of the cutter 46. In general, the incoming elongated strips of waste paper 22 and magazines and/or newspapers are cut and chopped into short lengths as the cutter knives 50 move into close proximity with the cutter bar 44. These pieces move through the hollow interior of the knife cylinder and eventually move through the recutter screen 58 which also cooperates with the rotating cutter knives 50 to provide a final cutting and sizing section to produce a final product with discrete particles of the desired maximum size. It has been found that a recutter screen having openings of round, square, oblong or rectangular shape and dimensioned to a size range of approximately ½ inch to 1½ inches produces a finished product wherein almost all of the material pieces are approximately 3 inches or less in maximum dimension and with pieces approximately of a size ranging from ⅛ inch × 3 inches to ¼ inch × 2 inches. The material generally has a loose density of 4.5 to 6 pounds per cubic foot depending upon how much corrugated box board is utilized in proportion to other types of paper products such as magazines, newsprint, cardboard sheets and the like. When the product fed to the cutter 46 is entirely corrugated box board material, a density range of 5 to 7 pounds per cubic foot usually results. This is in contrast with material of the same type passed through a conventional hammermill which pulverizes much of the material into extra fine particles similar to flour. Hammermill treated material is very light in weight and fluffy, usually having a density in the range of ½ to 2 pounds per cubic foot.

Other brands of cutters 46 have been utilized and these have included a "Mark I" and a "Mark II" which operates at a higher rotor speed of 1200 RPM in comparison with 6–700 RPM with the "Fox" cutter. The "Mark I" machine includes six blades and provides 7200 cuts per minute resulting in a throughput capacity of 3000–5000 pounds per hour of corrugated box board as compared to 1000–2000 pounds per hour with the smaller "Fox" cutter. The "Mark II" machine has twelve blades and provides 14,400 cuts per minute and is capable of handling 10000–12000 pounds per hour of corrugated board. The particular size of cutter that is chosen is of course, dependent on the capacity desired.

Referring to FIG. 2, therein is illustrated a graphical representation of the cut pieces of waste paper material which are discharged from the recutter screen. These pieces, in general, have cut rather than torn edges and the shapes and sizes that are shown are typical of the cut material that is actually produced and ready for pelletizing. In general, the discrete pieces of cut material are polygonal in shape and the linear edges are formed by the cutting action of the blades 50 in cooperation with the cutter bar 44 and the recutter screen 58.

The suction fan 60 is powered by a motor 62 of suitable horsepower and speed characteristics, and the fan pulls the cut pieces of material through the final recutter screen 58 into the fan housing around the rotor. The fan may also be powered from the cutter drive. The material is directed from the outlet of the fan (as indicated by the arrow "C") via an air duct to an elevated storage bin or hopper indicated by the numeral 66.

Preferably, the hopper 66 is of the type having a live bottom formed by a reversible, endless belt or chain conveyor 68 or a live bottom of screw conveyors which is driven by a motor 70 and controllable to selectively move the belt in opposite directions as described as indicated by the arrows "D" and "E". The hopper or storage bin also includes a screened exhause opening for permitting the air supplied by the fan 60 to escape as the material drops onto the movable bottom. Preferably, the hopper may also include a material level indicator 72 which can be utilized to provide a warning signal whenever the material level in the hopper reaches a particular low level. The hopper is also provided with one or more magnets 74 which may be a permanent type or electromagnets for attracting any magnetic metal impurities which might be present in the chopped material. From time to time and during periods of shut down, the metal which is collected on these magnets is removed and thus an additional safety feature is provided for reducing the possibility of metal material remaining in the finished product whether in baled, bagged or pelletized form.

The hopper includes discharge outlets at opposite ends and at one end (left side), there is provided a discharge chute having a pair of outlets one of which is connected to a baling device or baler 78 and the other of which is connected to supply material to a bag filler 80. One or more additional magnets 82 are provided in the discharge chute 76 to help preclude the possibility of metal objects reaching the baler or the bag filling apparatus. The baler 78 may be of a type such as a hydraulic solid waste baler manufactured by the Freeman Baler Company and the bag filling machine 80 may be of a type manufactured and sold by the Black Products Company of Chicago, Illinois. When the movable conveyor 68 of the hopper 66 is driven to move to the left in the direction of the arrow "D", the chopped material is directed toward the baler 78 or bagging machine 80 and these devices compress the cut material to a greater density, for example, 15 to 25 pounds per cubic foot in finished bales and 7 to 9 pounds per cubic foot in filled bags. The finished and packaged material made from certain waste paper materials such as corrugated box board in these density ranges and the aforementioned size ranges, may be directly fed to ruminant animals and has excellent assimilibility and digestibility. The baled or bagged product may also be readily intermixed and blended with other feed materials to provide highly nutritious feed. It has been found that feed mixtures containing as high as 70% of the finished waste paper products in accordance with the invention provide excellent animal nutrition resulting in high growth.

Also, the finished cut material is suitable for many other purposes, including plant mulches, fertilizer ingredients, a carrier for all kinds of chemicals, fats, molasses, whey, wet materials and potting soil. The material is useful as an aggregate with portland cement, gypsum and other binding systems to make lightweight insulating concrete either cast in place, pre-cast or sprayed in place and is useful as a fuel or as an absorber for all kinds of liquids, oils, etc.

In accordance with the invention, if it is desirable to produce pelleted material from the finished porduct contained in the bin or hopper 66, the motor 70 is driven in a reverse direction causing the movable belt 68 to move in the direction indicated by the arrow "E" towards the right hand outlet end. The material flows over a magnet 74 which collects metallic impurities therefrom then moves into a feed auger 84 which directs the material toward a pellet mill station generally indicated by the reference numeral 86. Material from the auger 84 flows through a chute or conduit 88 connected to the inlet side of a conditioning mixer 90 having an auger-like rotor driven by a motor 92. If desired, live steam is injected into the material in the mixer conditioner 90 via a steam supply line 92. A flow control valve 94 and a pressure gauge 96 is provided for effecting proper control of the steam input. In addition, a lubricant of water or molasses or other liquids may be supplied to the product as it moves through the conduit 88 or in the conditioning mixer 90 via a supply line 98 connected to a water tank or a molasses tank 100. A flow control valve 102 is provided in the line 98 to proportion the desired amount of waster or molasses into the cut and sized paper pieces. Material is directed from the mixer conditioner 90 into the feed auger 104 of the pellet mill 106. It has been found that a minimum amount of water prevents molding and the water use is minimized by adding the water at the point where the paper is fed into the pellet extrusion die.

The pellet mill may be of a conventional type such as that produced and sold by the California Pellet Mill Company or the Sprout Waldron Company. These mills include an annular, pellet extrusion die 108 and material is forced outwardly through the die openings to form a pelleted product under heat and pressure of extrusion. The rotor of the pellet mill is driven by a relatively large horsepower motor 110 or other prime mover which supplies the power required to extrude the material under heat and pressure radially outwardly through sizing die openings. The finished material in pellet form passes from the die passes out into a discharge chute 112 as shown by the arrow "F" and is discharged into awaiting bags or bins by means of a screw auger 114 or other suitable conveying implement. Pellets cannot be readily formed without a lubricant such as water for example. Either enough water must already be in the paper material or it must be added. It has been found that it is best to add the latter or other lubricant to the paper material just before the material goes into the pellet forming die. This arrangement gives the least amount of water in the finished pellet and results in stable pellet formation. If excess water is present in the pellets and is not dried, the pellets tend to develop molds.

Other suitable lubricants are molasses (up to 60% or more if desired), fats, oils, various caustics, and additives such as urea and materials which contribute to the end product usage and sometimes which serve as a lubricant instead of water. Liquids and additives such as oils, tallows, acids, adhesives, water soluble compounds, detergents, liquid feed supplements, nitrogenious compounds, etc. may be supplied from a tank farm 116 and fed to the material as it enters the pellet die 108 via a line 118. When the pellets are used as a fuel it is extremely desirable to have and it has been found that the addition of water just before the paper material enters the die results in a minimum amount of water and a highly stable pellet that is not readily susceptible to molding and decay.

Proper control of pelleting and selection of additives renders the pelleted material more useful for subsequent processes. For example, a pellet which easily comes apart in water is desired for mulching and for recycling into paper. The finished product in pellet form may also be directly fed to animals without further additives, or may be blended with other animal food stuffs as desired. The pellet mill may be operated to make either a hard durable pellet or a loose meal type or chip type pellet, both of which are densified for easy handling and transport. The selection of the type of die and the additives used makes this possible. The pellets made from various types of waste paper materials are relatively dust free, easy to handle and transport, easy to convey, weigh and blend and have a wide variety of uses. For example, in pellet form, the waste paper products are much easier to handle than bales. In addition, in recycling processes, the pellets will disintegrate in water. For boiler fuels, the pellets can be handled similar to coal and the pellets are useful as lightweight aggregates for concrete. Pellets are useful as potting soil additives, fertilizers and plant mulches.

In addition, it will be seen that the method and apparatus of the present invention provides an excellent animal feed for ruminant and other animals which is highly digestible and which is easy to handle and blend with other feed materials. The process is economical and permits an economical use of what might otherwise be simply a waste material to be disposed of. The product provides a convenient and ecologically viable source of cellulosic fiber which is needed by ruminant type animals.

Although the present invention has been described with reference to a single illustrative embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. A method of converting waste paper materials into a more useful form comprising the steps of:
   feeding said material in a transverse direction across a cutter bar into the path of helical knives moving in a rotary cylindrical path which is tangent to said cutter bar around a pivot axis parallel thereof for a first phase of linear shear cutting said material moving across said bar into pieces;
   second cutting said pieces by passing said pieces out of said cylindrical knife path through the sizing openings in an arcuate recutter screen positioned adjacent a portion of the cylindrical path of said moving knives and having screen cutter bars for a second phase of final shear cutting of said pieces to pass through said sizing openings, said second phase of said final shear cutting producing a plurality of pieces of flat paper materials having random polygonal shapes with at least a pair of shear cut linear edges and a majority of said pieces having a maximum dimension between any two points thereon of 3 inches and a minimum dimension of approximately $\frac{1}{8}$ inch and extruding said finally shear cut pieces under pressure in an extrusion die having multiple elongated extrusion passages to form pellets of circular cross-section therefrom.

2. The method of claim 1 wherein said sorting step includes removing potentially contaminating products.

3. The method of claim 2 wherein said sorting includes removing metal and non-paper materials from said waste paper products.

4. The method of claim 1 including the step of cutting said waste paper products into elongated strips for feeding across said cutter bar.

5. The method of claim 1 wherein said sizing openings are at least $\frac{1}{2}$ inch.

6. The method of claim 1 wherein said waste paper materials include newspaper.

7. The method of claim 1 including the step of adding a lubricant to said pieces just before said extrusion step.

8. The method of claim 7 wherein said lubricant is chosen from a group including water, molasses, fats, caustic compounds, nitrogenous conpounds, urea materials, oils, whey, a liquid adhesive, a liquid detergent, liquid feed supplements and acids.

9. The method of claim 1 wherein said waste paper materials include corrugated box board.

10. The method of claim 1 wherein said waste paper materials include paper board.

11. The method of claim 1 wherein said waste paper materials include paper sheets.

12. The method of claim 1 wherein said waste paper materials include magazines.

13. The method of claim 1 wherein said waste paper materials include corrugated box board cuttings.

14. The method of claim 1 wherein said waste paper materials include boxes of corrugated box board.

* * * * *